Jan. 30, 1945.  A. W. EWEN  2,368,351

THERMIONIC VALVE CIRCUIT

Filed Nov. 29, 1943

Inventor
Alfred Whitelaw Ewen.
By
Attorney

Patented Jan. 30, 1945

2,368,351

UNITED STATES PATENT OFFICE 2,368,351

THERMIONIC VALVE CIRCUITS

Alfred Whitelaw Ewen, London, England, assignor to Standard Telephones and Cables Limited, London, England, a company of Great Britain Application November 29, 1943, Serial No. 512,273
In Great Britain December 23, 1942

8 Claims. (Cl. 171—95)

The present invention relates to electrical rectifying arrangements associated with thermionic valve amplifiers, and is more particularly concerned with means for rendering the relation between the input signal and the output rectified current independent of variations of the valve and rectifier characteristics and operating sources.

In many electrical measuring systems an alternating current or voltage very often has to be measured by means of an amplifier-rectifier arrangement in such manner that the value of the current or voltage is indicated on a direct-current instrument. It is a well known difficulty that the calibration of the arrangement generally depends on the characteristics of the valves used and on the voltages of the operating sources, and is liable to change from time to time. For this reason adjusting devices of varying complexity have had to be provided to compensate for the effects of changes due to the replacement of valves, variations in the supply voltages, ageing of valves, and the like.

Attempts to minimize these difficulties resulted in inefficient and often complicated circuit arrangements, and there is further a fundamental source of error in the most commonly used circuits in that the rectifiers tend to measure the peak amplitude, with the result that serious errors may occur if the alternating current or voltage has appreciable harmonics.

According to the present invention, these difficulties are overcome by providing an electrical rectifying arrangement comprising a negative feedback thermionic valve amplifier adapted for maintaining substantially constant the output current into a load of variable impedance, the current being produced by a given input signal, in which the load comprises two oppositely directed rectifiers connected in parallel, either of the rectifiers (or each of them) having connected thereto means for utilising the rectified current derived therefrom exclusively of the other rectifier.

The invention, according to another aspect, consists in an electrical rectifying arrangement comprising a pair of oppositely poled rectifiers connected in parallel to form the load for a negative feedback thermionic valve amplifier adapted to maintain the load current constant irrespective of variations in the load impedance, in which either of the rectifiers, or each of them, is arranged to supply a rectified current to a utilisation means individual thereto; the said rectified current being proportional to the average voltage over a single half wave of an alternating voltage applied to the input of the amplifier.

The invention will be explained with reference to the accompanying drawing, in which—

Figure 1:
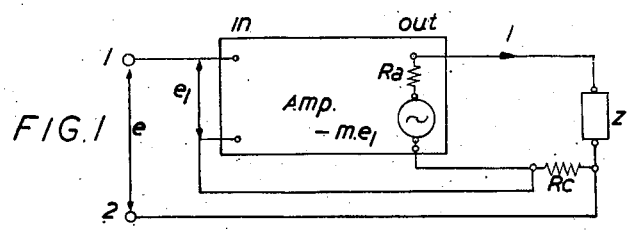
Fig. 1 shows a block schematic diagram of an amplifier with a negative feedback path.

Fig. 1 is taken from British Patent No. 545,535, issued on August 20, 1942. The amplifier $Amp$ can have any number of stages and the terminals $In$ are supposed to represent the control grid circuit of the first stage, and the terminals $Out$ represent the anode circuit of the last stage. If $e_1$ is the voltage applied to the terminals $In$, then an electromotive force $-me_1$ appears at the output terminals in series with the anode circuit impedance $R_a$. The voltage transfer ratio for the amplifier is accordingly $m$, which is preferably large.

The output current $I$ flows through the load impedance $Z$ and through the feedback resistance $R_c$, the signal voltage $e$ being applied to the input terminals $1, 2$ as indicated.

It is shown in Patent No. 545,535 that if $m$ is made sufficiently large, then $I$ is substantially equal to $-e/R_c$ and is thus independent both of the load $Z$ and the characteristics of the amplifier. This, however, will only hold so long as $R_a+Z$ is small compared with $m.R_c$.

Figure 2:
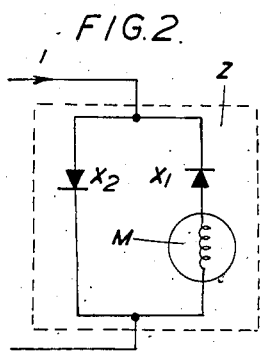
Figs. 2 and 3 show schematic circuit diagrams of two forms of the fundamental arrangement according to the invention.

According to the present invention, the load $Z$ comprises in essentials the circuit of Fig. 2. It consists of two parallel paths, one of which is occupied by a rectifier $X_1$ connected in series with a winding of a direct current indicating instrument or meter $M$, and the other by an oppositely directed rectifier $X_2$. These rectifiers may be of any type, such as selenium or copper oxide dry rectifiers, or diodes, or other thermionic valves arranged as rectifiers.

As will be clear from Fig. 2, the negative half waves of the current $I$ will pass substantially only through the rectifier $X_1$ and through the meter winding, and the positive half waves only through the rectifier $X_2$. So long as the impedance of the rectifier $X_1$ in the forward direction is small compared with $m.R_c$, the current flowing through the winding of the meter $M$ at any instant is equal to $-e_1/R_c$, where $e_1$ is the instantaneous value of $e$, and this has nothing to do with the characteristics of the rectifier $X_1$, or with the forward paths of the amplifier. The meter therefore measures the average value of the current flowing during the periods of the negative half waves.

The second rectifier $X_2$ provides a low impedance path for the positive half waves; and so long as its forward impedance is also small compared with $m.R_c$, the load Z through which the current I flows behaves practically like an ordinary linear impedance. It will be seen that the rectifiers need not be of the same type.

In this case, the rectifiers are acting as substantially perfect switches by which the negative portions of the waves are applied to the meter and the positive portions are by-passed.

The rectifiers should of course be chosen so that the impedance in the backward direction is very large compared with that in the forward direction, so that they do not appreciably shunt each other.

It will be noted that since the meter M measures the average amplitude of the negative half waves and not the peak amplitude, errors due to the presence of harmonics will be small.

Figure 3:
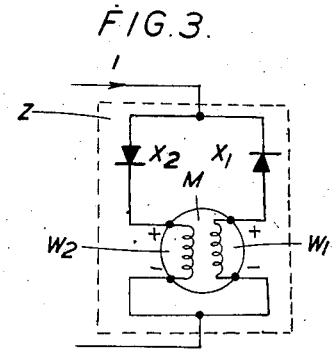

It will be obvious that the meter M could have been connected in series with $X_2$ instead of $X_1$; and moreover by providing it with two windings suitably connected, one in series with each rectifier, both half waves could be used, and the sensitivity could be thereby increased. This arrangement is shown in Fig. 3, in which the two windings $W_1$ and $W_2$, in the case of a moving coil meter, for example, comprise two parts of the same coil attached to the moving system and will be poled as indicated by the + and − signs, which indicate that a current flowing from + to − in either coil produces a deflection in the same direction. In this arrangement $X_1$ and $X_2$ will preferably be similar rectifiers and the windings $W_1$ and $W_2$ will be equal. Direct current meters of the type shown in Fig. 3 with two windings are well known.

It will be understood that the winding of the meter M in Fig. 2 is affected only by the rectified current derived from the rectifier $X_1$; and although in Fig. 3 both the windings $W_1$ and $W_2$ combine to produce a reading on the meter, each is affected only by the rectified current derived from the corresponding rectifier to the exclusion of that derived from the other rectifier. For this reason the meter winding or windings, rather than the instrument itself, will be regarded as the means employing the rectified current or currents.

Since the effect on the instrument M does not depend on the frequency or the characteristics of the rectifiers or amplifier, no appreciable change in the calibration can occur due to ageing, or changes in operating potentials, and the rectifiers or amplifier valves can be changed for others which need only be approximately similar without any effect. So long as the conditions are chosen so that the relation $I=-e/R_c$ is substantially correct, the reading depends only on $e$ and $R_c$.

The instrument may be calibrated by applying known alternating potentials at some convenient frequency to the input terminals 1, 2 (Fig. 1) and the readings will then be accurate over a very wide range of frequencies.

It will be evident that the range of the device may be very conveniently changed by simply changing the value of $R_c$.

Figure 4:
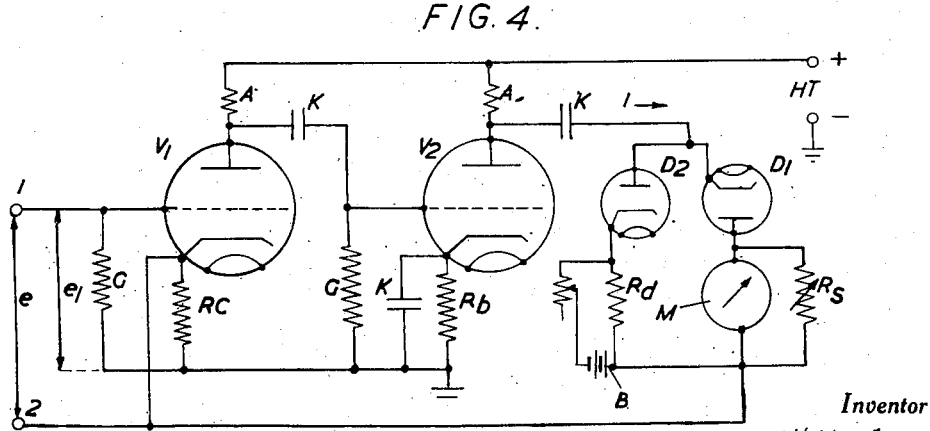
Fig. 4 shows a circuit of a practical embodiment.

A practical embodiment of the invention is shown in Fig. 4. The amplifier comprises two thermionic valves, $V_1$ and $V_2$, shown for simplicity as triodes, although screen grid valves or pentodes may be used if desired. Conventional auxiliary arrangements are shown, in which A is a resistance through which anode current is supplied from the anode source connected to the terminals HT+ and −, K is a coupling or bypass condenser, G is a grid leak resistance and $R_b$ a cathode biassing resistance. All these components may be suitably chosen according to known principles, or their functions may be carried out in other ways. If other kinds of valves are used, suitable means for biassing the extra grids will of course be supplied in any convenient way.

The feedback resistance $R_c$ is connected in series with the cathode of the valve $V_1$ and the rectifiers $X_1$ and $X_2$ of Fig. 2 are represented by two diodes $D_1$ and $D_2$ arranged in opposition.

A resistance $R_d$ is connected in series with the diode $D_2$, and a small adjustable direct current is passed through it from a local circuit containing a battery B (or in any other convenient way) in order to adjust the standing current which flows in the diode loop when no voltage is applied at the input terminals 1, 2. The local current through $R_d$ is in a direction to oppose the standing current, and will be adjusted so that the meter M gives a certain fixed small reading when there is no input voltage. This eliminates the scale error due to the standing current, which is liable to change if either of the diodes is replaced. A variable resistance $R_s$ connected across the meter M is used for adjusting the reading when calibrating.

When using the arrangement of Fig. 4, a suitable value of $R_c$ will be chosen, having regard to the sensitivity of the meter M and the magnitude of the voltages to be measured. A known alternating potential $e$ will be applied at the terminals 1, 2. $R_s$ is then adjusted until a reading on M corresponding to $e$ is produced. The apparatus may then be used without any further calibration to measure alternating voltages over a wide range of frequencies, and no further adjustments are necessary if any of the valves or diodes are replaced.

In an actual case of the circuit of Fig. 4, the readings of M were found to be accurate to within ± 1% over a frequency range of 10 to 4000 kilocycles per second. The range of voltages measurable was about 1 millivolt to 2 volts, a suitable switch being used to change the range of the device for the larger values. These figures are given for example only, and do not represent the limits of usefulness of the arrangement.

In this circuit diodes were used as rectifiers since it was to be operated at high frequencies: at moderately low frequencies dry rectifiers could be used since the rather high self capacity of such rectifiers would then be of little importance.

It will be understood that the arrangements described are not necessarily confined to measuring devices; the meter M might be replaced by a relay with one, or two, windings, for example, adapted to perform some function in response to an applied signal. The arrangement is particularly adapted for use when narrow operating limits are imposed, so that no re-adjustments to compensate for ageing, power supply changes or replacement of valves and so forth would be required. The invention is applicable wherever a fixed and unalterable relation between an applied potential and a resulting rectified current over a wide frequency range is required.

It will be clear from what has been said that everything depends upon the constancy of the resistance $R_c$. In general, of course, there is no difficulty in providing a constant resistance, but if the arrangement is to be independent of frequency over a wide range, this resistance and its connections must be appropriately designed to be effectively without appreciable reactance. If the range of the device is changed by changing $R_c$ as indicated above, care must be taken that $R_c$ is not reduced so much that the fundamental condition no longer holds; or if so, means must be provided for increasing in a corresponding manner, for example, by any suitable gain control device which might be coupled with the means for changing $R_c$.

What is claimed is:

1. Electric amplifier and rectifier including a negative feedback thermionic valve amplifier of the type adapted for maintaining substantially constant the value of the current, due to a given input signal, which flows in an output load of variable impedance, but making such current proportional to the input voltage, a load connected to said amplifier, including two oppositely poled rectifiers connected in parallel with one another and means connected in series with one only of the rectifiers for utilizing the rectified current derived exclusively from that rectifier.

2. Electrical amplifying and rectifying arrangement including a negative feedback thermionic valve amplifier adapted for maintaining substantially constant the value of the output current supplied into a load of variable impedance, but making such current proportional to the input voltage, said current being produced by a given input signal, a load receiving said output current from said amplifier, including two oppositely directed rectifiers connected in parallel with one another, a plurality of means, each connected in series with one only of the rectifiers for utilizing the rectified current derived exclusively from said rectifier to which said means is connected, and transducer means for combining the outputs of both utilization means to effect a single mechanical operation.

3. Amplifying and rectifying arrangement according to claim 2, in which each means connected to one rectifier only comprises a coil of a direct current meter, both said coils being connected so that the rectified currents flowing therethrough are additive in effect on said meter and are proportional to the average voltage applied to the input of the amplifier.

4. Electrical amplifier and rectifier including a thermionic valve amplifier having a forward amplifying path and a negative feedback path, a load connected to the output of said amplifier and including two rectifiers connected in parallel opposed, so chosen and arranged that when a given voltage is applied to the input terminals of the amplifier, the resulting load current is substantially independent of the load impedance, but proportional to the input voltage, and further including means connected in series with at one only of the rectifiers for utilizing the rectified current derived exclusively therefrom.

5. Electrical amplifier and rectifier according to claim 4, in which said negative feedback path comprises a feedback resistance connected in series with the cathode of one of the valves of the amplifier.

6. Electrical amplifier and rectifier according to claim 4, in which the product $m.R_c$ is chosen to be large compared with Z, $m$ representing the voltage transfer ratio of said forward amplifying path, $R_c$ representing the value of the feedback resistance and Z representing the impedance of the load.

7. Electrical amplifier and rectifier according to claim 1, in which the rectifiers are electronic diodes, whereby relatively high frequencies may be rectified.

8. Electrical amplifier and rectifier according to claim 1, in which the rectifiers are of the solid dry type, suitable for rectifying relatively low frequencies.

ALFRED WHITELAW EWEN.